United States Patent [19]

Wang

[11] Patent Number: 4,935,489

[45] Date of Patent: Jun. 19, 1990

[54] POLYSPIRODILACTAMSULFONE

[75] Inventor: Pen C. Wang, Houston, Tex.

[73] Assignee: Shell Oil Company, Houston, Tex.

[21] Appl. No.: 324,871

[22] Filed: Mar. 17, 1989

[51] Int. Cl.$^5$ ............................................. C08G 69/14
[52] U.S. Cl. .................................... 528/321; 528/171; 528/172; 528/173; 528/174; 528/323
[58] Field of Search ............... 528/323, 171, 172, 173, 528/174, 321

[56] References Cited

U.S. PATENT DOCUMENTS 4,008,203  2/1977  Jones ........................................ 260/49
4,108,837  8/1978  Johnson et al. ...................... 528/126
4,584,364  4/1986  Lubowitz et al. ................... 528/128

Primary Examiner—Harold D. Anderson

[57] ABSTRACT

The invention provides a novel class of thermoplastic polycyclic sulfone polymers incorporating within the polymer chain two different types of cyclic structures. More particularly, it provides polyspirodilactamsulfones wherein moieties of an aryl sulfone alternate with moieties of an oxyaryl-substituted 1,6-diaza[4.4] spirodilactam and, optionally, moieties of a di(oxyphenyl) compound.

29 Claims, No Drawings

POLYSPIRODILACTAMSULFONE

FIELD OF THE INVENTION

This invention relates to a novel class of polymeric materials which incorporate within the polymer chain moieties of an aryl sulfone and an oxyaryl-substituted 1,6-diaza [4.4]spirodilactam with moieties of a di(oxyphenyl) compound optionally additionally present.

BACKGROUND OF THE INVENTION

The class of thermoplastic polymers is well known in the art, being particularly useful because of the property of many such polymers of being deformable at relatively low temperatures. The thermoplastics are processed by conventional techniques such as extrusion, injection molding or thermoforming into films, packaging materials or shaped articles of established utility at relatively low temperatures without undue degradation of the polymer.

This property of low temperature deformation which makes many of the thermoplastics useful does, however, preclude the use of such polymers as engineering thermoplastics where exposure to elevated temperatures is likely to be encountered. When relatively high temperature applications for thermoplastics are contemplated, it is often useful to include within the polymeric chain one or more cyclic structures which typically will serve to raise the melting point or glass transition temperature of the polymer. Nevertheless, melting points or glass transition temperature near or above 200° C. are not frequently encountered in thermoplastic materials. Moreover, the processing of a number of thermoplastics which melt or soften above 200° C. leads to degradation of the polymer.

Polyarylene polymers which incorporate sulfone linking groups are disclosed by Johnson et al., U.S. Pat. No. 4,103,837. The use of polysulfone polymers to produce films is shown by Jones, U.S. Pat. No. 4,008,203. Lubowitz et al. describe a cross-linked oligomer containing disulfone moieties and ether linkages in U.S. Pat. No. 4,584,364. It would yet be of advantage to provide polysulfone polymers which are thermoplastics characterized by relatively high glass transition temperatures which are processable without undue degradation.

SUMMARY OF THE INVENTION

The invention provides a novel class of thermoplastic polycyclic sulfone polymers incorporating within the polymer chain a plurality of types of cyclic structures. More particularly, it provides polyspirodilactamsulfones wherein moieties of an aryl sulfone alternate with moieties of an oxyaryl-substituted 1,6-diaza [4.4]spirodilactam and, optionally, moieties of a di(oxyphenyl) compound.

DESCRIPTION OF THE INVENTION

The novel polymers of the invention are most conveniently produced by reaction of a salt, particularly an alkali metal salt, of a hydroxyaryl-substituted 1,6-diaza [4.4]spirodilactam and, if present, a di(hydroxyphenyl) compound, with a halo-substituted aryl sulfone. Reaction serve to produce a linear alternating copolymer or terpolymer wherein moieties derived from the halo-substituted aryl sulfone reactant alternate with moieties of the oxyaryl-substituted spirodilactam and, if present, moieties of the di(oxyphenyl) compound.

The spirodilactam moieties which are present in the polymers of the invention are derived from a 1,6-diazaspiro [4.4] nonane-2,7-dione compound which is substituted on each spiro ring nitrogen atom with a hydroxyaryl-containing substituent. One class of such spirodilactams has up to 60 carbon atoms inclusive and is represented by the formula

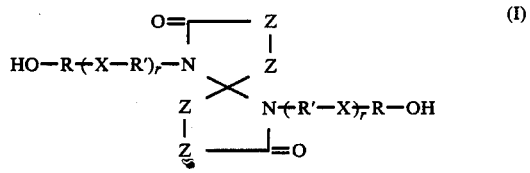

wherein Z independently is $>C(Z')_2$ in which Z' independently is hydrogen, lower alkyl of up to 4 carbon atoms inclusive, preferably methyl, halo, preferably the lower halogens fluoro or chloro, or aryl, preferably phenyl, or Z is such that two adjacent Z moieties taken together form a ring system Z" of from 5 to 7 ring atoms, up to two of which are heteroatoms selected from nitrogen, oxygen or sulfur, with the remainder of the ring atoms being carbon atoms, there being up to 15 carbon atoms inclusive in each Z", two of which form a bridge between the carbon atoms connected by the adjacent Z moieties. In formula 1, R independently is aromatic of up to 15 carbon atoms and up to 2 aromatic rings, inclusive, R' is R or an aliphatic group of up to 10 carbon atoms inclusive, r independently is 0 or 1 and X independently is a direct valence bond, alkylene of up to 8 carbon atoms inclusive, oxy, thio, sulfonyl, carbonyl, dioxyphenylene, 2,2-di(oxyphenyl)propane, di(oxyphenyl) sulfone and dioxydiphenylene. Each of R and R' is hydrocarbyl containing only atoms of carbon and hydrogen or is substituted hydrocarbyl containing additional atoms in the form of inert, monovalent carbon atom substituents such as halo, preferably the middle halogens chloro or bromo.

Spirodilactams of a considerable variety of structures are therefore suitably employed is the source of the spirodilactam moieties in the polymer of the invention. In the embodiment wherein the Z moieties of the compounds of formula I are not part of a fused ring system and are therefore acyclic, i.e., Z is $>C(Z')_2$, the hydroxyaryl-substituted spirodilactams are illustrated by 1,6-di(4-hydroxyphenyl)-1,6-diazaspiro[4.4]nonane-2,7-dione, 1,6-di(3-hydroxy-4-chlorophenyl)-3,8-dimethyl-1,6-diazaspiro[4.4]nonane-2,7-dione, 1,6-di[4-(3-hydroxybenzoyl) phenyl]-1,6-diazaspiro4.4]nonane-2,7-dione, 1,6-di(4-hydroxyphenyl)-3,3, 4,4,8,8,9,9-octamethyl-1,6-diazaspiro[4.4]nonane-2,7-dione, 1,6-di4-(4'-hydroxybiphenyl)]-3,3-dimethyl-1,6-diazaspiro[4.4]nonane-2,7-dione, 1,6-di[2-(4-hydroxyphenyl)-propyl]-1,6-diazaspiro[4.4]nonane-2,7-dione, 1,6-di[4-(4-hydroxyphenylisopropyl)phenyl]-1,6-diazaspiro[4.4]nonane-2,7-dione and 1,6-di(3-hydroxyphenyl)-3,4,8,9-tetrafluoro-1,6-diazaspiro[4.4]nonane-2,7-dione. In the embodiment wherein adjacent Z moieties of each spiro ring form a cyclic structure fused to the spiro ring system, i.e., adjacent Z groups are Z", illustrative spirodilactams include 1,6-di(4-hydroxyphenyl)-3,4,8,9-dibenzo-1,6-diazaspiro[4.4]nonane-2,7-dione, 1,6-di[4-(4-hydroxyphenyloxy)phenyl]- 3,4,8,9-di(pyrido)-1,6-diazaspiro[4.4]nonane-2,7-dione and 1,6-di[4-(4-hydroxyphenylthio)phenyl]-3,4,8,9-di(cyclopentano)-1,6-diazaspiro[4.4]-nonane-2,7-dione. Also suitable are those spirodilactams wherein one spiro ring has a fused cyclic substituent and the other spiro ring is free of fused cyclic substituents, e.g., 1,6-di(4-hydroxyphenyl)-3,4-benzo8-methyl-1,6-diazaspiro[4.4]nonane-2,7-dione, and 1,6-di[1-(4-hydroxynaphthyl)-3,4-cyclopentano-1,6-diazaspiro4.4nonane-2,7-dione.

In general, the compounds of the above formula I wherein both R and R' are aromatic and hydrocarbyl are preferred, especially such compounds wherein each r is 0. The class of 1,6-di(hydroxyphenyl) spirodilactams is particularly preferred, especially the 1,6-di(4-hydroxyphenyl) spirodilactams. Within the spirodilactam portion of the molecule, spirodilactams are preferred wherein the rings are free from fused cyclic substituents, i.e., each Z is >C(Z')$_2$, or wherein both spiro rings have fused cyclic substituents, i.e., adjacent Z groups of both spiro rings are Z''. The compound 1,6-di(4-hydroxyl:benzyl)-1,6-diazaspiro-4.4]nonane-2,7-dione is a particularly preferred member of the former class and 1,6-di(hydroxyphenyl)-3,4,8,9-dibenzo-1,6-diazaspiro[4.4]nonane-2,7-dione is a preferred member of the latter class.

The hydroxyaryl-substituted spirodilactams of the above formula I are compounds which are described and claimed as compositions of matter in copending U.S. patent application Ser. No. 245,618, filed Sept. 16, 1988. The general method of production, also described and claimed in this copending application and copending U.S. patent application Ser. Nos. 172,000 filed Mar. 23, 1988, and 172,052 filed Mar. 23, 1988, each incorporated herein by reference, is by reaction of at least one hydroxy-containing primary amino compound and a spirodilactam precursor. In terms of the spirodilactam of formula I, the hydroxy-containing primary amino compound is represented by the formula

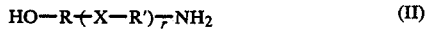

$$HO-R(X-R')_r-NH_2 \qquad (II)$$

wherein R, R', r and X have the previously stated meanings. The spirodilactam precursor is a 4-oxoheptandioic acid compound or a 1,6-dioxaspiro[4.4]nonane-2,7-dione. In terms of the spirodilactams of formula I, the 4-oxoheptanedioic acid compound spirodilactam precursors are represented by the formula

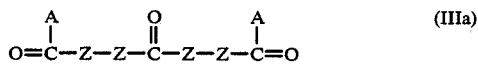

(IIIa)

wherein Z has the previously stated meaning and A independently is hydroxy, lower alkoxy of up to 4 carbon atoms, inclusive, or halo, preferably hydrogen or the middle halogens chloro or bromo. The spirodilactone spirodilactam precursor, in terms of the spirodilactams of formula I, is represented by the formula

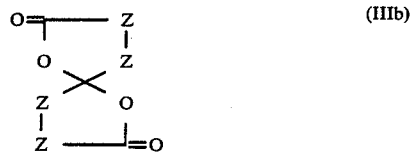

(IIIb)

wherein Z has the previously stated meaning.

The acyclic 4-oxoheptanedioic acid compounds are known compounds or are produced by known methods, but certain of the esters of formula IIIa, i.e., the compounds wherein A is alkoxy, are conveniently produced by the process disclosed and claimed in copending U.S. patent application Ser. No. 171,999, filed Mar. 23, 1988, incorporated herein by reference. Interconversion of the acids, esters and acid halides of formula IIIa is by conventional methods. The production of 4-oxoheptanedioic acid compounds which contain cyclic substituents is by the process of Cava et al., J. Am. Chem. Soc., 20, 6022 (1955). The spirodilactones of formula IIIb are produced by the process of Pariza et al., Synthetic Communications, Vol. 13(3), pp. 243–254 (1983) or by the process of Conover et al., U.S. Pat. No. 1,999,181.

The hydroxy-containing primary amino compound and the spirodilactam precursor react in a molar ratio of 2:1 although in practice reactant ratios from about 8:1 to about 1:1.5 are satisfactory. Reactant ratios that are substantially stoichiometric are preferred. Reaction is conducted in a liquid phase solution in an inert reaction diluent such as an N-alkylamide, e.g., N,N-dimethylformamide, N,N-dimethylacetamide or N-methyl-2-pyrrolidone. Reaction takes place under reaction conditions at an elevated temperature, typically from about 80° C. to about 250° C. The reaction pressure should be sufficient to maintain the reaction mixture in a liquid phase. Such pressures are up to about 20 atmospheres. Subsequent to reaction the spirodilactam product of formula I is recovered !rom the product mixture by conventional methods such as solvent removal, precipitation and chromatographic separation. Recovery of the spirodilactam product is not required, however, and particularly in cases where substantially stoichiometric quantities of reactants were employed the spirodilactam may be reacted further in situ without isolation.

The halo-substituted aryl sulfone reactant in the process of the invention is a compound of from 2 to 4 aromatic rings, at least two of which are connected by a sulfonyl linkage, i.e., a —SO$_2$— group, and having a halogen substituent on each of the terminal aromatic rings. One class of such halo-substituted aryl sulfone reactants is represented by the formula

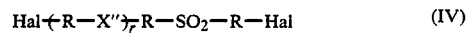

$$Hal(R-X'')_r R-SO_2-R-Hal \qquad (IV)$$

wherein R, and r have the previously stated meanings, X'' is a direct valence bond, oxy, thio, sulfonyl carbonyl, dioxyphenylene or dioxydiphenylene, and Hal independently is halogen, i.e., fluoro, chloro, bromo or iodo, but preferably is lower halogen chloro or fluoro. The substitution of the linking moieties or halo substituents on each R aromatic ring is variable and is suitably ortho or para, or mixtures thereof. The preferred halo-substituted aryl sulfone reactants are those wherein each linking moiety or halo substituent attached to each R aromatic ring is para to the other linking group or halo substituent attached to the same R aromatic ring. Illustrative of the halo-substituted aryl sulfone reactants of the above formula IV are di(4-chlorophenyl)sulfone, 4-(4-chlorophenyloxy)phenyl 4-chlorophenyl sulfone, 4-(4-bromophenylthio)phenyl 4-bromophenyl sulfone, 4-chlorophenyl 4-bromophenyl sulfone, di[4-(4-chlorophenyl)phenyl]sulfone, 1-(4-chlorophthyl) 4-fluorophenyl sulfone, 4-(4-chlorophenyloxy)phenyl 2-chlorophenyl sulfone and 4-[4-(bromophenyloxy)phenyl]4-bromophenyl sulfone. Of these halo-substituted aryl sulfone reactants, compounds of the above formula II wherein r is 0 are preferred, especially such compounds wherein R is phenylene, particularly p-phenylene. These halo-substituted aryl sulfone reactants are known compounds or are produced by known methods.

The source of the optional third monomer of the polymers of the invention is a di(hydroxyphenyl) compound of up to 20 carbon atoms and up to two aromatic rings, inclusive. Such compounds are illustrated by dihydroxybenzenes such as hydroquinone and resorcinol, dihydroxynaphthalenes such as 2,7-dihydroxynaphthalene, 1,5-dihydroxynaphthalene as well as the class of such compounds is represented by the formula

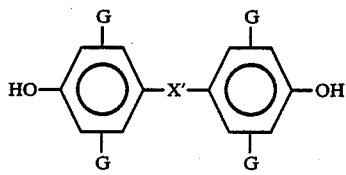

wherein G independently is hydrogen, lower alkyl or halo, preferably middle halo, and X' is a direct valence bond, alkylene of up to 8 carbon atoms inclusive, oxy, thio, sulfonyl or carbonyl. Illustrative of the compounds of formula V are 2,2-di(4-hydroxyphenyl)propane, 2,2-di(4-hydroxy-3-methylphenyl)propane, 2,2-di(4-hydroxy-3-chlorophenyl)methane, di(4-hydroxy-3,5-dibromophenyl)ketone, (4-hydroxyphenyl)(4-hydroxy-3-bromophenyl)ether and (4-hydroxy-3,5-dibromophenyl)(4-hydroxy-3-methylphenyl)sulfone. The preferred X' group is 2,2-propylene and the compound 2,2-di(4-hydroxyphenyl)propane, also known as bisphenol A or BPA, is a preferred member of the class of compounds of formula V.

The process of producing the novel polymers of the invention comprises the reaction of the halo-substituted aryl sulfone reactant with the alkali metal salt of the hydroxyaryl-substituted spirodilactam and, if their monomer is present, the alkali metal salt of the di(hydroxyphenyl) compound. The product is an alternating copolymer of moieties derived from the halo-substituted aryl sulfone reactant and the hydroxyaryl-substituted spirodilactam when a third monomer is not employed. In the modification where the third monomer is present, the product is an alternating terpolymer wherein moieties derived from the halo-substituted aryl sulfone alternate with either moieties of the substituted spirodilactam or moieties from the di(hydroxyphenyl) compound.

Polymerization is typically preceded by the formation of the alkali metal salt of the hydroxyaryl-substituted spirodilactam and, if present, the di(hydroxyphenyl) compound. Although lithium, sodium, potassium, rubidium or cesium salts are suitably employed in the process of the invention, the preferred alkali metal salts are the sodium salts or the potassium salts. The alkali metal salt is typically prepared by dissolving the hydroxyaryl-substituted spirodilactam and, if present, the di(hydroxyphenyl) compound in a suitable reaction diluent and adding a slight stoichiometric excess of an alkali metal base, e.g., the hydroxide, carbonate or bicarbonate, while the water present or formed is removed by conventional methods such as extraction or distillation. A preferred method of water removal is by azeotropic distillation with a portion of the reaction diluent. Dimethyl sulfoxide is a preferred diluent for this purpose although other diluents such as mixtures of N-alkylamides, e.g., N,N-dimethylformamide, N,N-dimethylacetamide or N-methyl-2-pyrrolidone, with alkylated benzenes such as toluene and ethylbenzene are also satisfactory. Subsequent to reaction with the alkali metal base, the alkali metal salt(s) are recovered by conventional methods such as solvent removal or precipitation, but the salts are frequently employed in situ without isolation for subsequent reaction with the halo-substituted aryl sulfone, which may be present during alkali metal salt production. In the modification where terpolymer is to be produced the alkali metal salt of the hydroxyarylsubstituted spirodilactam and the alkali metal salt of the di(hydroxyphenyl) compound are conveniently produced by neutralization o: a mixture of the two hydroxy-containing compounds. Alternatively, however, the alkali metal salts may be produced separately and subsequently mixed.

The polymerization is conducted under polymerization conditions in the liquid phase in an inert reaction diluent. Preferred diluents are polar diluents and are capable of dissolving at least a portion of each reactant at polymerization temperature. In a particularly useful procedure, the polymerization diluent is the same as the diluent employed in alkali metal salt production, but such is not required.

In the reaction mixture, no alkali metal salt of the di(hydroxyphenyl) compound is required since the presence of this third monomer is optional. However, when present, the alkali metal salt of the di(hydroxyphenyl) compound is present in a molar quantity up to nine times the quantity of the alkali metal salt of the hydroxyaryl-substituted spirodilactam, but preferably in a molar quantity from about twice to about one-half the molar quantity to the alkali metal salt of the hydroxyaryl-substituted spirodilactam. The halo-substituted aryl sulfone reactant is present in a molar ratio of from about 3:1 to about 1:3 with the total molar quantity o! alkali metal salt reactants. However, the sulfone reactant is preferably present in a substantially stoichiometric quantity, i.e., a molar ratio of sulfone reactant to total alkali metal salt reactants of substantially 1:1.

Polymerization takes place at an elevated temperature, typically from about 80° C. to about 250° C. but more often from about 100° C. to about 200° C. The polymerization reaction pressure is sufficient to maintain the reaction mixture in a liquid phase. Such pressures are up to about 20 atmospheres, preferably up to about 10 atmospheres. During polymerization the reactant contact is maintained by conventional methods such as stirring or shaking and subsequent to reaction the polymer product is recovered by well known techniques such as solvent removal, precipitation or extraction.

The polymer product is a linear alternating polymer wherein moieties of an arylene sulfone of from 2 to 4 aromatic rings, at least two of which are connected with a sulfone linkage with any additional rings being fused or connected by a direct valence bond, oxy, thio, sulfonyl, carbonyl, dioxyphenylene, di(oxyphenyl) sulfone or dioxydiphenylene, alternates with moieties of oxyaryl-substituted 1,6-diaza4.4]spirodilactam having the oxyaryl substituents on the spiro ring nitrogen atoms and, optionally, di(oxyphenyl) compound moieties. When the polymer product is a copolymer having only moieties of the arylene sulfone and substituted spirodilactam, the polymer is represented by repeating first segments of the formula

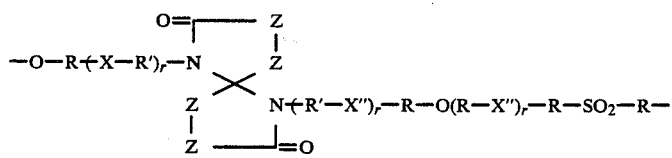

wherein R, R', r, X and Z have the previously stated meanings. In the modification where the polymer product is a terpolymer, the product additionally incorporates second segments represented by the formula

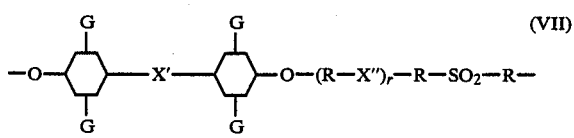

wherein R, r, X and G have the previously stated meanings. Within the terpolymer chain, a plurality segments of formula VI and a plurality of segments of formula VI are randomly found with the ratio of segments of formula VII to segments of formula VI being up to about 9:1 but preferably from about 2:1 to about 1:2. In general, the copolymers of the invention are preferred over corresponding terpolymers. In the case of such copolymers there will only be segments of formula VI in the polymer chain.

The nomenclature of the polymer products is not easily determined because of the complexity thereof. However, a representative copolymer has alternating units of di(4-phenylene)sulfone and 1,6-di(4-oxyphenyl)-1,6-diaza[4.4]nonane-2,7-dione illustratively produced by the reaction of di(4-chlorophenyl)sulfone with the sodium salt of 1,6-di(4-hydroxyphenyl)1,6-diazaspiro[4.4]nonane-2,7-dione. In a representative terpolymer, the polymer chain would additionally include 2,2-di(4-oxyphenyl)propane units when the sodium salt of 2,2-di(4-hydroxyphenyl)propane was additionally present in the reaction mixture. The identity of other polymer products will be apparent from consideration of the above formulas for the reactants and the polymer product. Of particular interest are the copolymers and terpolymers of the invention having molecular weights from about 1,000 to about 100,000.

The polymeric polyspirodilactamsulfones of the invention are thermoplastic polymers characterized by a relatively high glass transition temperature, typically over 200° C. and often even higher. Thus the polymers are processed by the usual methods employed for thermoplastics but the resulting products are useful in applications where dimensional stability at elevated temperature is desired. Among such applications are containers for use with food and drink and lease parts for electric and electronic applications.

The invention is further illustrated by the following Illustrative Embodiments which should not be construed as limiting the invention.

ILLUSTRATIVE EMBODIMENT I

A mixture of 16.9 g (0.05 mole) of 1,6-di(4-hydroxyphenyl)-1,6-diazaspiro[4.4]nonane-2,7-dione, 250 ml of dimethyl sulfoxide, 50 ml of toluene and 4 g of sodium hydroxide was charged to a 2 liter flask equipped with a mechanical stirrer and a condenser. The flask and contents were heated to 130°-140° C. while the water formed was removed by azeotropic distillation with the toluene. The mixture was then heated to 150°-155° C. and maintained at that temperature for one hour. Heating was stopped and when the mixture had cooled to 50°-60° C., 14.3 g (0.05 mole) of di(4-chlorophenyl)sulfone was added and the temperature of the mixture was rapidly raised to 145° C. The mixture was maintained at this temperature for 6 hours and at 160° C. for 0.5 hours. The mixture was then cooled and poured into 15 liters of water which had been acidified with 5.0 g of oxalic acid. The precipitated product was recovered by filtration, washed with water and dried in a vacuum oven. The resulting polyspirodilactamsulfone had a glass transition temperature of 225° C. The nuclear magnetic resonance spectra of the product were consistent with the structure of a polymer having alternating units of 1,6-di(4-oxyphenyl)-1,6-diazaspiro[4.4]nonane-2,7-dione and di(4-phenylene)sulfone.

ILLUSTRATIVE EMBODIMENT II

In a 5 liter round-bottom flask equipped with a mechanical stirrer and a nitrogen inlet were placed 287.2 g (1 mole) of di(4-chlorophenyl)sulfone, 338 g (1 mole) of 1,6-di(4-hydroxyphenyl)-1,6-diazaspiro[4.4]nonane-2,7-dione, 140 g (1.01 mole) of anhydrous potassium carbonate, 400 ml of toluene and 2 liters of N-methyl-2-pyrrolidone. The mixture was heated at 160° C. until the water formed by reaction was removed by azeotropic distillation with the toluene. Heating at 160° C. was continued until the mixture became viscous and 2.87 g(0.01 mole) of di(4-chlorophenyl)sulfone was added. The resulting mixture was cooled, pulverized in water, washed twice with warm methanol, twice with warm water and an additional time with methanol. The product was dried in a vacuum oven at 110° C. for 12 hours to give 545.9 g of a white polymer, a yield of 99%. The polymer had a glass transition temperature of 272° C. and the nuclear magnetic resonance spectra of the product were consistent with units of di(4-phenylene)sulfone alternating with units of 1,6-di(4-oxyphenyl)-1,6-diazaspiro[4.4]nonane-2,7-dione.

ILLUSTRATIVE EMBODIDMENT III

In a 5 liter round-bottom flask equipped with a mechanical stirrer and a nitrogen inlet were placed 114.0 g (0.5 mole) of 2,2-di(4-hydroxyphenyl)propane, 169.0 g (0.5 mole) of 1,6-di(4-hydroxyphenyl)-1,6-diazaspiro[4.4]nonane-2,7-dione, 289.0 g (1.0 mole) of di(4-chlorophenyl)sulfone, 140.0 g (1.01 mole) of anhydrous potassium carbonate, 600 ml of toluene and 2 liters of N-methyl-2-pyrrolidone. The mixture was then heated at 160° C. until the water formed was removed from the reaction mixture by azeotropic distillation with the toluene. Heating at 160° C. continued until the mixture became viscous and 2.87 g (0.01 mole) of di(4-chlorophenyl)sulfone was added. The resulting product mixture was cooled, pulverized in water, washed twice with warm methanol, twice with warm water and an additional time with warm methanol. The product was dried in a vacuum oven at 110° C. for 12 hours to give 492.3 g of a white polymer, a yield of 99%. The product had a glass transition temperature of 234° C. and the nuclear magnetic resonance spectra of the product were consistent with units of di(4-phenylene)sulfone alternating with an equal mixture of units of 1,6-di(4-oxyphenyl)-1,6-diazaspiro[4.4]nonane-2,7-dione and 2,2-di(oxyphenyl)propane.

ILLUSTRATIVE EMBODIMENT IV

A number of the physical properties of a film prepared from the polyspirodilactamsulfone products of Illustrative Embodiment II (IE 2) and Illustrative Embodiment II (IE 3) were determined and compared with a film produced from a commercial polyarylsulfone marketed by Union Carbide as UDEL ®Polysulfone (U1) and also a polyarylsulfone produced by the process of U.S. Pat. No. 4,108,837 (U2) also thought to be similar in structure to UDEL. The results are shown in the following table.

| Film Properties of Polysulfone | | | | |
|---|---|---|---|---|
| Polymer/Property | IE1 | IE2 | U1 | U2 |
| Tg (°C. by DSC) | 272 | 234 | 190 | 190 |
| Tensile Modulus ($\times 10^{-5}$, psi) | 2.8 | 2.8 | 2.56 | 2.93 |
| Tensile Strength (psi, yield) | 11,500 | 9,100 | 7,860 | — |
| Elongation (%, yield) | 9.0 | 7.4 | 5.2 | — |
| Elongation (%, break) | 14.8 | 13.0 | 13.1 | 7.0 |
| Impact Strength (KJ/M$^2$ by ZGL) | 16.9 | 27.8 | 21.8 | — |
| Notched Izod (ft lb/in) | — | 1.61 | 1.69 | — |

What is claimed is:

1. A linear, alternating polyether polymer wherein (1) moieties of an arylene sulfone of from 2 to 4 aromatic rings, at least two of which are joined by sulfone linkage, alternate with (2) moieties of a 1,6-diaza spirodilactam having oxyaryl substituents on the spiro ring nitrogen atoms, with or without (3) moieties of a di(oxyphenyl) compound.

2. The polymer of claim 1 having a repeating first segment of the formula

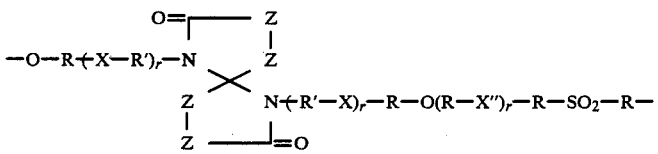

with or without a repeating second segment of the formula

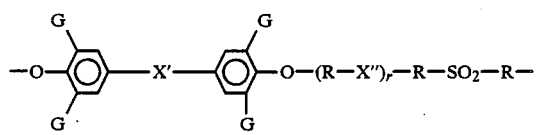

wherein R independently is, aromatic of up to 15 carbon atoms and up to 2 aromatic rings, inclusive, R' is R or an aliphatic group of up to 10 carbon atoms, inclusive, r independently is 0 or 1, X independently is a direct valence bond or X is alkylene of up to 8 carbon atoms inclusive, oxy, thio, sulfonyl, carbonyl, dioxyphenylene, 2,2-di(oxyphenyl)propane, di(oxyphenyl) sulfone or dioxydiphenylene, Z independently is $>C(Z')_2$ in which Z' independently is hydrogen, lower alkyl, lower halogen, or phenyl, or Z is such that two adjacent Z moieties taken together form a ring system Z" of from 5 to 7 ring atoms, up to two of which are heteroatoms selected carbon atoms, there being up to 15 carbon atoms inclusive in each Z", two or which form a bridge between the two carbon atoms connected by the adjacent Z moieties, X" is a direct valence bond,, oxy, thio, sulfonyl, carbonyl, dioxyphenylene or dioxydiphenylene, x is a direct valence bond or X' is alkylene of up to 8 carbon atoms inclusive, oxy, thio, sulfonyl or carbonyl and G independently is hydrogen, lower alkyl, chloro or bromo, the molar ratio of the second segment to the first segment being up to 9:1.

3. The polymer of claim 2 wherein the polymer is of the repeating first segment.

4. The polymer of claim 3 wherein R' is R.

5. The polymer of claim 4 wherein each r is 0.

6. The polymer according to any one of claims 2, 3, 4 or 5 wherein Z is $>C(Z')_2$.

7. The polymer of claim 6 wherein each Z' is hydrogen or methyl.

8. The polymer of claim 7 wherein R is phenylene.

9. The polymer of claim 8 wherein Z' is hydrogen and R is p-phenylene.

10. The polymer according to any one of claim 2, 4, or 5 wherein adjacent Z moieties are Z".

11. The polymer of claim 10 wherein R is phenylene.

12. The polymer of claim 11 wherein Z" is benzo.

13. The polymer of claim 12 wherein R is p-phenylene.

14. The polymer of claim 2 wherein the polymer comprises and first and second repeating segments.

15. The polymer of claim 14 wherein the molar ratio of the second segment to the first segment is from about 2:1 to about 1:2.

16. The polymer of claim 15 wherein G is chloro or bromo

17. The polymer of claim 16 wherein G is bromo.

18. The polymer of claim 15 where G is hydrogen.

19. The polymer of claim 18 wherein R' is R.

20. The polymer of claim 19 wherein each r is 0.

21. The polymer of claim 19 wherein X' is 2,2-propylene.

22. The polymer according to any one of claims 14, 17, 18, 19, 20 or 21 wherein Z is $>C(Z')_2$.

23. The polymer of claim 22 wherein Z' is hydrogen or methyl.

24. The polymer of claim 23 wherein R is phenylene.

25. The polymer of claim 24 wherein Z' is hydrogen and R is p-phenylene.

26. The polymer according to any of claims 14, 17, 18, 19, 20 or 21 wherein Z moieties are Z".

27. The polymer of claim 26 wherein R is phenylene.

28. The polymer of claim 27 wherein Z" is benzo.

29. The polymer of claim 28 wherein R is p-phenylene.

* * * * *